Oct. 17, 1933.　　　F. H. RASMUSSEN　　　1,931,081
DISPLAY DEVICE
Filed Nov. 11, 1931　　　3 Sheets-Sheet 1
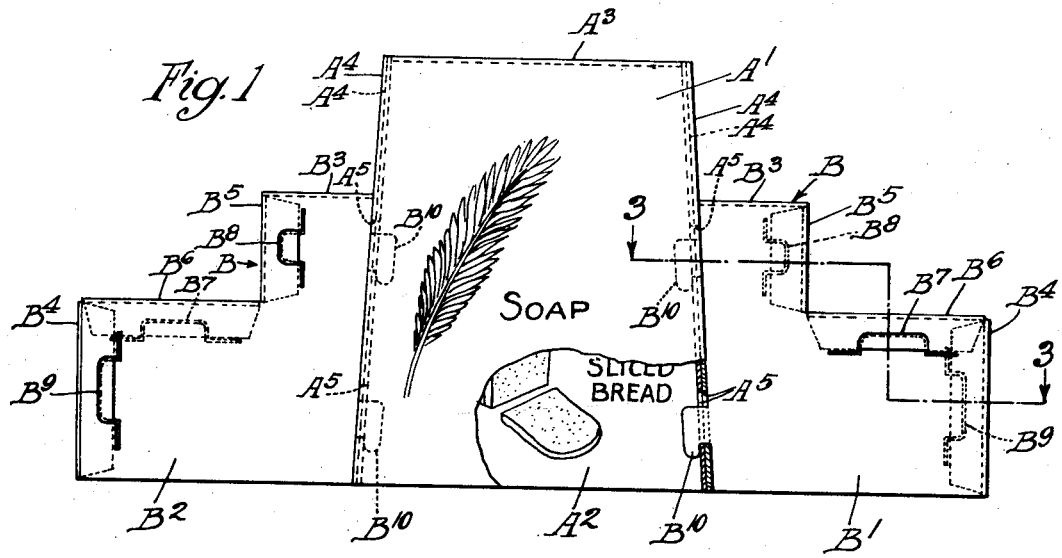
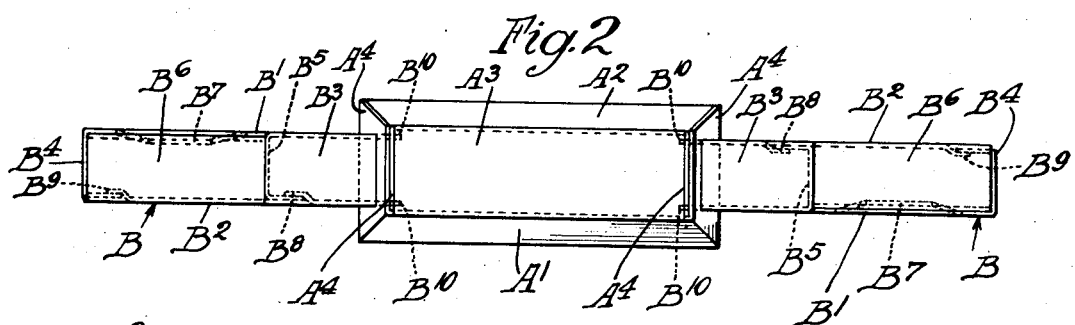
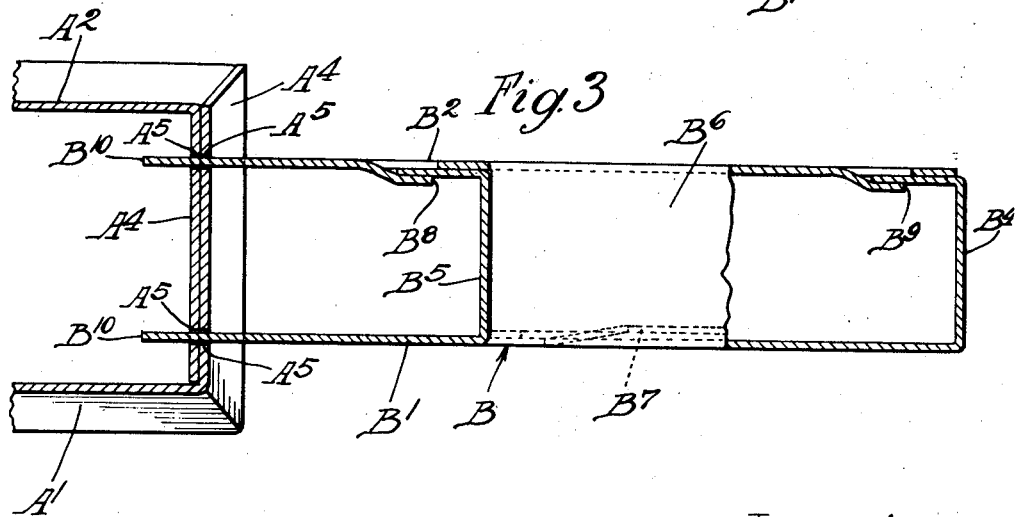
Inventor
Frank H. Rasmussen
by Parker & Carter
Attorneys.

Oct. 17, 1933.  F. H. RASMUSSEN  1,931,081
DISPLAY DEVICE
Filed Nov. 11, 1931  3 Sheets-Sheet 2
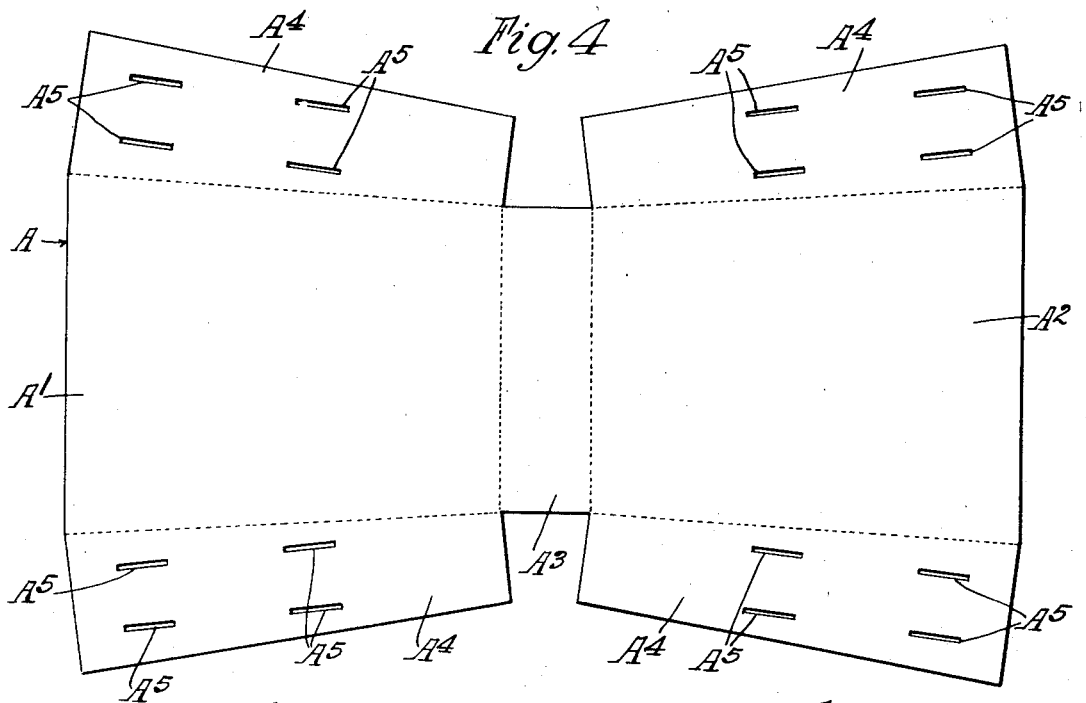
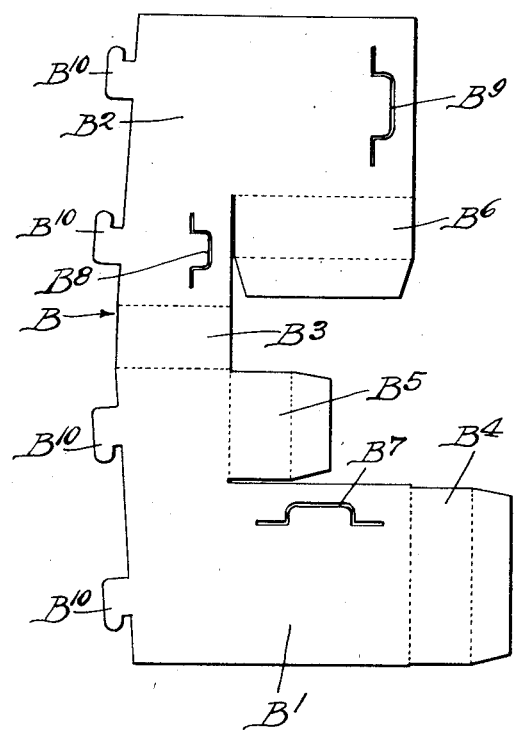
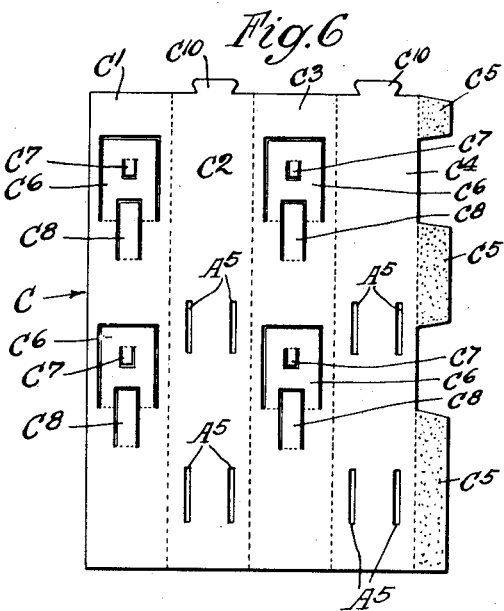
Inventor
Frank H. Rasmussen
by Parker + Carter
Attorneys.

Oct. 17, 1933.  F. H. RASMUSSEN  1,931,081
DISPLAY DEVICE
Filed Nov. 11, 1931   3 Sheets-Sheet 3
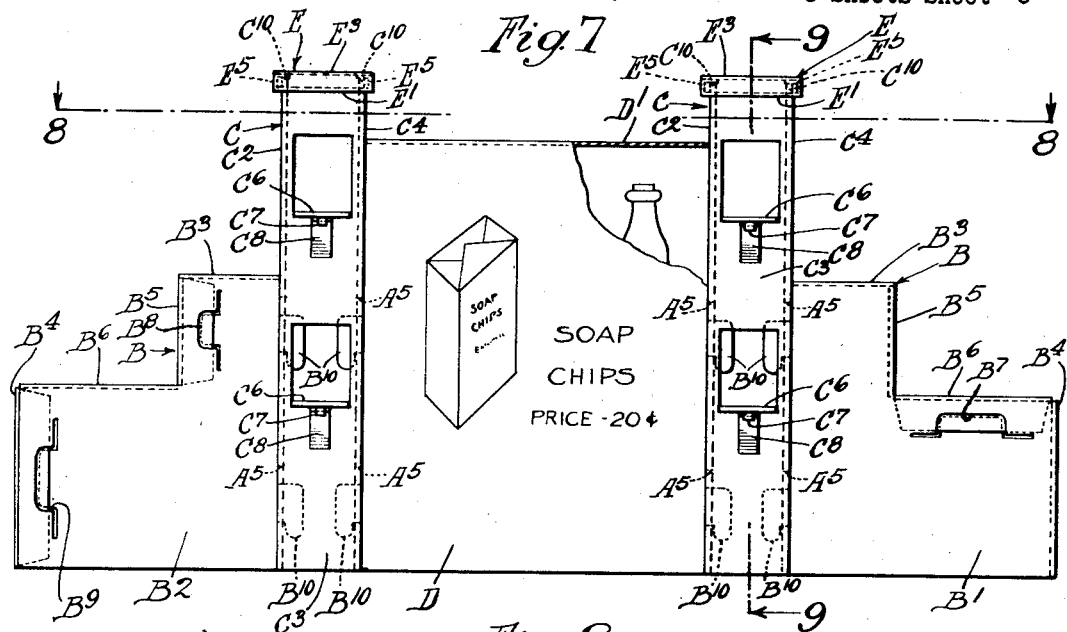
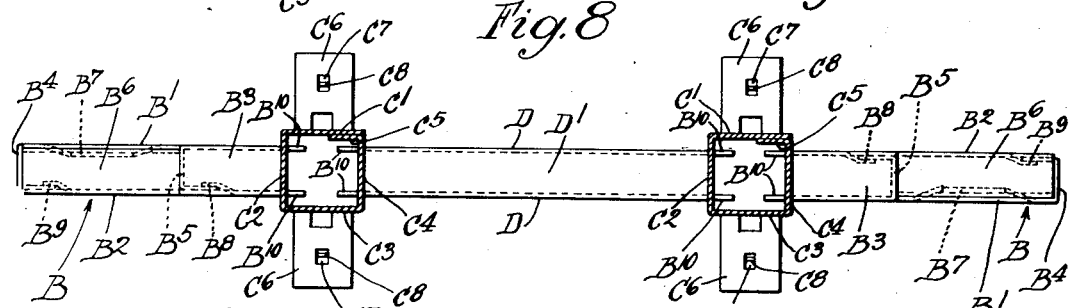
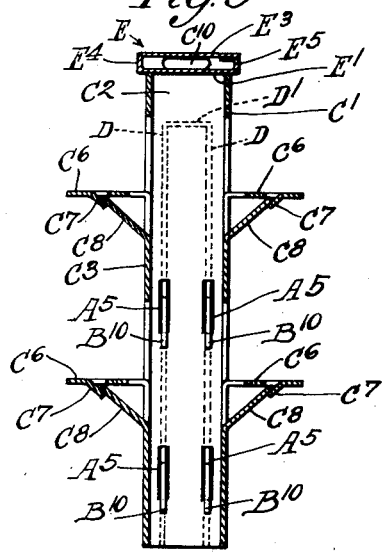
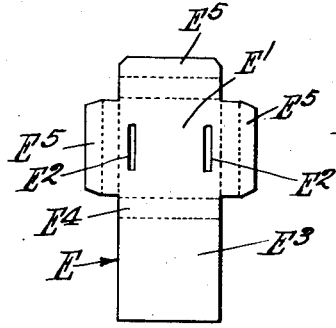
Inventor
Frank H. Rasmussen
by Parker & Carter
Attorneys Patented Oct. 17, 1933

1,931,081

UNITED STATES PATENT OFFICE 1,931,081

DISPLAY DEVICE

Frank H. Rasmussen, Chicago, Ill., assignor to Magill-Weinsheimer Company, Chicago, Ill., a corporation of Illinois Application November 11, 1931
Serial No. 574,239

9 Claims. (Cl. 40—126)

My invention relates to a display device and has for one purpose the provision of a relatively cheap and efficient display device. Another purpose is the provision of a reversible display device the element or elements of which, or some of them, may be reversed to vary the ornamental or display or advertising material on the exterior thereof. Another object is the provision of a display device made of multiple, separable members, some or all of which may be reversible. Other objects will appear from time to time in the course of the specification and claims.

I illustrate my invention more or less diagrammatically in the accompanying drawings, wherein—

Figure 1 is a side elevation;
Figure 2 is a plan view;
Figure 3 is a section on the line 3—3 of Figure 2;
Figure 4 illustrates a blank for the central section of Figure 1;
Figure 5 illustrates a blank for a side section of Figure 1;
Figure 6 illustrates a blank for one of the intermediate members of Figure 7;
Figure 7 is an elevation of a variant form of the device;
Figure 8 is a section on the line 8—8 of Figure 7;
Figure 9 is a section on the line 9—9 of Figure 7; and
Figure 10 is a detail.

Like parts are indicated by like symbols throughout the specification and drawings.

Referring to the drawings, and for example to Figures 1 and following, I illustrate in Figure 4 a blank generally indicated as A and having side members $A^1$ $A^2$, a connecting top member $A^3$ and overlapping end flaps $A^4$ provided with pairs of slots $A^5$.

B indicates the form for one of the side members of Figure 1. It includes side faces $B^1$ $B^2$, the connecting top member $B^3$, an end flap $B^4$ for the lowest portion of the member $B^1$, a side flap $B^5$ for the higher portion of the member $B^1$, and a top flap $B^6$ for the lower portion of the members $B^1$ and $B^2$. Appropriate slots $B^7$ $B^8$ $B^9$ are provided to receive the flaps and locking ears $B^{10}$ are formed along the edges of the members $B^1$ $B^2$. It will be understood that in the assembly of the device of Figure 1 the members $A^1$ and $A^2$ are folded along the dotted lines which separate them from the top member $A^3$ and the flaps $A^4$ are folded and caused to overlap to align the slots or apertures $A^5$. Similarly the members $B^1$ and $B^2$ are folded along the dotted lines which separate them from $B^3$, the flaps $B^4$ $B^5$ $B^6$ being folded to penetrate the appropriate slots $B^7$ $B^8$ or $B^9$ and the locking members $B^{10}$ are caused to penetrate the slots $A^5$. The interpenetration of the members $B^{10}$ with the slots $A^5$ locks the entire assembly in position. It will be understood that each side of each blank is formed with a different color or decorative scheme or wording or the like. Also there may be a differentiation between $A^1$ and $A^2$ and between $B^1$ and $B^2$. Thus assuming that the parts are in the position indicated in Figure 1, the front face of all three of the assembled members might be employed for one display, and the rear face for a second display. In order to change the display the user need merely reverse the display member on his shelf, counter or window. Further, since both sides of the blanks are printed, the operator may disassemble the individual elements, some or all of them, and re-assemble them in reversed relationship, with the inside pattern now on the outside. This will give him a choice of two more displays so that with a single display device the user has a choice of four displays. It will be also noted that the various flaps and connections are sufficiently tight or close to prevent any substantial penetration of dust and dirt. This is important since a display may be positioned in a window or on a show case for some weeks before being turned inside out to provide a new display and it is important that the new display should not become dirty.

Referring to Figures 6 and following, I may employ intermediate members or columns which need not be reversible. I illustrate for example the form or blank C of Figure 6 which includes the four sides $C^1$ $C^2$ $C^3$ $C^4$. One of them may have the adhesive tabs or ears $C^5$, whereby the device may be permanently assembled. Two sides are indicated as having pairs of slots $A^5$, corresponding with the slots of the flaps $A^4$ of the blank A. In the form herein shown, for example in Figure 6, alternate sides are provided with the slots $A^5$ and the intermediate sides are provided with shelf members $C^6$ having securing ears $C^7$ inter-penetrating with larger supporting ears or brackets $C^8$, all the various ears being stamped out of the single blank and providing outwardly extending shelves upon which goods may be positioned for display.

In Figures 7 and 8 I illustrate the application of end members corresponding to the blanks B of Figure 1. I may also employ an intermediate member having sides D, top $D^1$, and securing ears B¹⁰ along the edges of the side members D, whereby the central display member may be secured in the position in which it is shown in Figures 7 and 8.

E indicates any suitable blank for a cap or cover for the top of the member C. It may include a central portion E¹ with the slots E² to receive the ears C¹⁰ on the form C. E³ indicates a top member which may be folded to overlie the member E¹, being connected to it by the intermediate hinge portion E⁴. E⁵ are tabs or flaps which may serve to close the remaining three sides of the cap thus formed.

It will be realized that whereas I have described and shown a practical and operative device, nevertheless many changes might be made in the size, shape, number and disposition of parts without departing from the spirit of my invention. In particular I do not wish to be limited to any specific arrangement of sections or of printing thereon since my invention lends itself to a wide variation in combination and sub-combination of component parts. I therefore wish my description and drawings to be taken as in a broad sense illustrative and diagrammatic, rather than as limiting me to my specific showing. For example, whereas I have illustrated securing means formed integrally with a form, it will be understood that I may employ different securing or fastening means, such as clips or other fasteners, which may be entirely separate from the self-contained interlocking arrangement shown in the drawings.

I claim:

1. In a display device, an upstanding self-supporting display member including a single main form of fibrous material or the like, and a shelf or shelves upset from said form, outwardly projecting therefrom, supporting brackets for said shelves, integral with said form and adapted to be bent into supporting relationship with such shelf or shelves.

2. In a display device, an upstanding self-supporting display member including a single main form of fibrous material or the like, and a shelf or shelves upset from said form, outwardly projecting therefrom, and an additional display member in interlocking relationship with said first mentioned display member.

3. In a display device, an upstanding self-supporting display member including a single main form of fibrous material or the like, and a shelf or shelves upset from said form, outwardly projecting therefrom, and an additional display member in interlocking relationship with said first mentioned display member, said last mentioned display member including a foldable form having display material on each face, said form being reversible to expose either face, the first mentioned self-supporting display member being adapted to interlock therewith when either face of the reversible form is exposed.

4. In a display device, a plurality of upwardly extending members adapted to be supported upon a horizontal surface, each such member including front, rear and side portions, said side portions including overlapping parts, an interlocking connection between said members including parts on one member penetrating a plurality of overlapping side members on another, said interlocking connection being adapted to lock said members together and to hold the overlapping side members against relative movement.

5. In a display device, a plurality of upwardly extending members adapted to be supported upon a horizontal surface, each such member including front, rear and side portions, said side portions including overlapping parts, an interlocking connection between said members including parts of one member penetrating a plurality of overlapping side members on another, said interlocking connection being adapted to lock said members together and to hold the overlapping side members against relative movement, and additional integral securing means for said members.

6. In a display device, a plurality of upwardly extending members adapted to be supported upon a horizontal surface, each such member including front, rear and side portions, said side portions including overlapping parts, an interlocking connection between said members including parts on one member penetrating a plurality of overlapping side members on another, said interlocking connection being adapted to lock said members together and to hold the overlapping side members against relative movement, and a shelf or shelves upset from one or both of said interlocking members.

7. In a display device, a plurality of upwardly extending members adapted to be supported upon a horizontal surface, each such member including front, rear and side portions, said side portions including overlapping parts, an interlocking connection between said members including parts on one member penetrating a plurality of overlapping side members on another, said interlocking connection being adapted to hold the overlapping side members against relative movement.

8. In a display device, a plurality of upwardly extending members adapted to be supported upon a horizontal surface, each such member including front, rear and side portions, said side portions including overlapping parts, an interlocking connection between said members including parts on one member penetrating a plurality of overlapping side members on another, said interlocking connection being adapted to lock said members together and to hold the overlapping side members against relative movement, said members having different display material on their outside and their inside faces, said members being readily reversible, the interlocking connection being equally effective when one or more of the members are reversed.

9. In a display device, an upstanding self-supporting display member including a single main form of fibrous material or the like, and a shelf or shelves upset from said form, outwardly projecting therefrom, and an interlocking tongued supporting connection between each such bracket and the shelf opposed thereto.

FRANK H. RASMUSSEN.